United States Patent
Gane et al.

(10) Patent No.: US 9,879,139 B2
(45) Date of Patent: Jan. 30, 2018

(54) PROCESS FOR MANUFACTURING CALCIUM CARBONATE MATERIALS HAVING A PARTICLE SURFACE WITH IMPROVED ADSORPTION PROPERTIES

(75) Inventors: Patrick A. C. Gane, Rothrist (CH); Matthias Buri, Rothrist (CH); Beat Karth, Oberoenz (CH); Claudia Pudack, Zürich (CH)

(73) Assignee: Omya International AG, Oftringen (CH)

(*) Notice: Subject to any disclaimer, the term of this patent is extended or adjusted under 35 U.S.C. 154(b) by 325 days.

(21) Appl. No.: 12/998,722

(22) PCT Filed: Dec. 2, 2009

(86) PCT No.: PCT/EP2009/066223
§ 371 (c)(1),
(2), (4) Date: Jul. 26, 2011

(87) PCT Pub. No.: WO2010/063757
PCT Pub. Date: Jun. 10, 2010

(65) Prior Publication Data
US 2011/0297043 A1 Dec. 8, 2011

Related U.S. Application Data

(60) Provisional application No. 61/205,206, filed on Jan. 16, 2009.

(30) Foreign Application Priority Data

Dec. 4, 2008 (EP) ..................................... 08170747

(51) Int. Cl.
*C09C 3/04* (2006.01)
*D21H 17/67* (2006.01)
(Continued)

(52) U.S. Cl.
CPC .............. *C09C 1/021* (2013.01); *C09C 3/041* (2013.01); *D21H 17/675* (2013.01);
(Continued)

(58) Field of Classification Search
None
See application file for complete search history.

(56) References Cited

U.S. PATENT DOCUMENTS 2,750,299 A * 6/1956 Hansen, Jr.
3,006,779 A * 10/1961 Davis .................. D21H 19/385
106/427

(Continued)

FOREIGN PATENT DOCUMENTS

EP 0046573 A1 9/1982
EP 0100947 A1 2/1984
(Continued)

OTHER PUBLICATIONS

Vlasov et al.; Science for Ceramic Production, Sintering of Calcium Carbonate in the Presence of Lithium Carbonate Additive; Glass and Ceramics; vol. 54, Nos. 11-12; 1997.*
(Continued)

*Primary Examiner* — Guinever S Gregorio
(74) *Attorney, Agent, or Firm* — Amster, Rothstein & Ebenstein LLP (57) ABSTRACT

The invention relates to a process for manufacturing calcium carbonate materials having a particle surface with improved adsorption properties of dispersant, using at least one lithium ion-containing compound, the calcium carbonate material obtained by this process, the use of the calcium carbonate materials in paper, paints and plastics, as well as the use of the lithium ion-containing compounds in the manufacturing process.

57 Claims, 2 Drawing Sheets

(51) Int. Cl.
D21H 17/69 (2006.01)
D21H 19/38 (2006.01)
C09C 1/02 (2006.01)

(52) U.S. Cl.
CPC .......... D21H 17/69 (2013.01); D21H 19/385 (2013.01); *C01P 2002/72* (2013.01); *C01P 2004/61* (2013.01); *C01P 2004/62* (2013.01); *C01P 2006/12* (2013.01); *C01P 2006/22* (2013.01); *C01P 2006/60* (2013.01)

(56) References Cited

U.S. PATENT DOCUMENTS

| 5,181,662 | A | * | 1/1993 | Bousquet et al. | 241/16 |
| 6,315,867 | B1 | * | 11/2001 | Skuse et al. | 162/181.1 |
| 6,767,973 | B2 | | 7/2004 | Suau et al. | |
| 2003/0045647 | A1 | * | 3/2003 | Suau | B01F 17/0028 525/329.7 |
| 2006/0162884 | A1 | | 7/2006 | Gane et al. | |
| 2011/0263774 | A1 | * | 10/2011 | Mongoin | B01F 17/0028 524/425 |

FOREIGN PATENT DOCUMENTS

| EP | 0100948 A1 | 2/1984 |
| EP | 0129329 A2 | 12/1984 |
| EP | 0261039 A1 | 8/1986 |
| EP | 0542643 A1 | 5/1993 |
| EP | 0542644 A1 | 5/1993 |
| EP | 0850685 A2 | 7/1998 |
| JP | 5367729 A | 6/1978 |
| JP | 05201725 A | 8/1993 |
| WO | 9112278 A1 | 8/1991 |
| WO | 0249766 A2 | 6/2002 |
| WO | WO 2006/081501 A | 8/2006 |
| WO | 07072168 A1 | 6/2007 |
| WO | WO 2007/141269 A | 12/2007 |
| WO | 08010055 A1 | 1/2008 |

OTHER PUBLICATIONS

Champion et al.; Pre-Eutectic Densification of Calcium Carbonate Doped with Lithium Carbonate; Journal of Thermal Analysis and Calorimetry; vol. 56, pp. 1461-1473; 1999.*
The International Search Report dated Feb. 11, 2010 for PCT Application No. PCT/EP2009/066223.
The Written Opinion of the International Searching Authority dated for PCT Application No. PCT/EP2009/066223.
Notice of Opposition to a European Patent dated Mar. 19, 2014 in connection with European Patent Application No. 09799058.4.
Forschungsbericht 107 01 016/01 "Schwermetalle and andere Schadstoffee in Düngemitteln," 1992.
Meyers Konversations-Lexikon, Fourth Edition, 1885-1892, vol. 10, p. 835, in internet since 2005, keyword, lithium.
Developments in Soil Science (Book 7), 1980.
Mayne C D, entitled "The Limnology of Three Limestone Rock Quarries in East-Central Nebraska and Western Iowa Transactions of the Nebraska Academy of Sciences," 21, 1994, 1-7.
Encarnacian R A et al., entitled "Interactions of Lithium-Bearing Solutions with Calcite during Dissolution," macla No. 11, Septiembre '09 revista de la sociedad espanola de minerlogia, 169-170.
Pastero L et al., entitled "Morphology of Calcite (CaCO3) Crystals Growing form Aqueous Solutions in the Presence of Li+ Ions." Surface Behavior of the {0001} Form. Crystal Growth & Design 2004, vol. 4, No. 3, 485-490.
Rajam S et al., entitled Selective Stabilization of the (001) Face of Calcite in the Presence of Lithium J.Chem. Soc., Chem. Commun., 1990, 1789-1792.
Response to the Communication of Notice of Opposition pursuant to Rule 79)1) EPC dated May 2, 2014 in connection with European Patent Application No. 09799058.4.
Summary of Facts and Submissions dated May 12, 2015 in connection with European Patent Application No. 09799058.4.
The Office Action dated Jun. 3, 2016 for U.S. Appl. No. 13/868,527.
Office Action dated May 26, 2014 for CA 2,744,927.
Office Action dated Jun. 4, 2015 for CA 2,744,927.
Office Action dated Jun. 6, 2016 for CA 2,744,927.
Office Action dated Apr. 18, 2017 for CA 2,744,927.
Office Action dated Jan. 14, 2013 for CN 200980152001.5.
Office Action dated Sep. 4, 2013 for CN 200980152001.5.
Office Action dated Nov. 19, 2013 for GC GCC/P/2009/14787.
Office Action dated Jul. 2, 2015 for GC GCC/P/2009/14787.
Office Action dated Mar. 2, 2017 for GC GCC/P/2009/14787.
Office Action dated Jun. 22, 2012 for EP 09 799 058.4.
Office Action dated Jun. 25, 2013 for JP 2011-539015.
Office Action dated Aug. 25, 2104 for KR 10-2011-7015485.
Office Action dated Sep. 24, 2012 for MX/a/2011/005665.
Office Action for RU 2011127182.
Office Action dated Jan. 4, 2013 for TW 098141449.
Office Action dated Jan. 4, 2013 in Response to Examination Report No. 103-2-6-01165-10320020400.
Search Report dated Jun. 23, 2009 for EP 08170747.3.
JPD Office Action dated Dec. 4, 2015.

* cited by examiner

PROCESS FOR MANUFACTURING CALCIUM CARBONATE MATERIALS HAVING A PARTICLE SURFACE WITH IMPROVED ADSORPTION PROPERTIES

This is a U.S. national phase of PCT Application No. PCT/EP2009/066223, filed Dec. 2, 2009, which claims priority to European Application No. 08170747.3, filed Dec. 4, 2008 and U.S. Provisional Application No. 61/205,206, filed Jan. 16, 2009.

The present invention relates to the technical sector of suspensions of carbonate-containing material or dried mineral materials and their applications in the fields of paper, paint and plastics and more particularly their applications in the paper industry, like the manufacturing or the production and/or coating of paper sheets.

In the manufacturing method of a sheet of paper, cardboard or analogous product, one skilled in the art increasingly tends to replace part of the expensive cellulose fibres by cheaper mineral matter in order to reduce the cost of the paper while improving its properties.

This calcium carbonate-containing material, with which one skilled in the art is well familiar comprises, for example natural calcium carbonate (GCC) such as marble, calcite, limestone and/or chalk, and/or synthetic calcium carbonate (PCC) such as scalenohedral and/or rhombohedral and/or calcitic and/or vateritic crystal forms and miscellaneous analogous fillers containing calcium carbonates such as dolomite or mixed carbonate based fillers of various metals such as, in particular, calcium associated with magnesium and analogues, various matter such as talc or analogues, and mixtures of these fillers, such as, for example talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

For a long time now, it has been quite common to use in a wet grinding process, as grinding aid agents, water soluble polymers based on partially or totally neutralised polyacrylic acid or its derivatives (EP 0 046 573, EP 0 100 947, EP 0 100 948, EP 0 129 329, EP 0 261 039, EP 0 516 656, EP 0 542 643, EP 0 542 644) to provide aqueous mineral suspensions, but these grinding aid agents do not allow to obtain the requested above-mentioned refinement and viscosity criteria or do not allow to obtain the requested stability of the pH of the aqueous mineral suspensions over time or do not have sufficient capability of developing scattering visible light as required by the end user in paper application.

The skilled man knows another type of solution disclosed in WO 02/49766, EP 0 850 685, WO 2008/010055, WO 2007/072168 to obtain aqueous suspensions of refined mineral material, with a dry matter concentration that can be high, while having a low Brookfield™ viscosity that remains stable over time. This known type of solution disclosed the use of specific dispersants like copolymers of acrylic acid with maleic acid or like particular rate of neutralization or like the use of inorganic fluorine compound used to put into aqueous suspension of the mineral particles issuing from the mechanical and/or thermal concentration step following a step of wet grinding at a low solid content without the use of dispersing agent nor grinding aid.

Additionally, the skilled man in the art knows the U.S. Pat. No. 3,006,779, which discloses a completely different solution based on an inorganic dispersant consisting of a homogeneous mixture of sodium phosphate glass, zinc oxide and a potassium or lithium salt or hydroxide.

In the same way the WO 2006/081501 teaches the use of inorganic dispersant like lithium silicate.

Finally, the dissertation entitled "Influence of polyelectrolyte adsorption on rheology of concentrated calcite dispersion" (Robert Petzenhauser—1993) which studies the influence of different polyacrylates with regard to the calcite suspension confirms that difficulties exist in term of the stability of viscosity of the resulting suspensions with all the studied polyacrylates, including lithium polyacrylates.

Nevertheless none of the known solutions provides the skilled man with a solution to the problem of achieving calcium carbonate-containing material be it in a dry form or in the form of a suspension having a dry matter concentration that can be high, while having a low Brookfield™ viscosity that remains stable over time, and a good pH buffer capacity as well as allowing to work at reduced dispersant or grinding aid agent content and/or increased solid content, wherein the calcium carbonate materials have a particle surface with improved adsorption properties of dispersants.

Thus, one object of the present invention is to provide a process for manufacturing calcium carbonate materials having a particle surface with improved adsorption properties of dispersants for high stability suspensions.

Furthermore, it is highly desirable that in such a process, no compounds are added, which might react in an uncontrollable manner in the environment, in which they are used.

For example there are ionic compounds which tend to form water insoluble salts, hydroxides or oxides or complexes with further compounds in certain pH ranges.

Therefore, it is a further object of the present invention to provide a process, which uses compounds, which do not undergo any undesirable side reactions in the environment of the mineral materials, especially in the aqueous environment thereof, i.e. that compounds such as those in the form of a salt do not undergo any side-reactions, but remain unchanged regarding their ionic components, be it in the salt form or dissociated form.

Faced with the above-mentioned problems of obtaining an aqueous mineral calcium carbonate-containing material suspensions with the required properties while minimizing the dispersant and/or grinding aid agent demand without decreasing the properties of the final products like the optical properties of the paper, the Applicant found surprisingly that certain lithium ion-containing compounds act as adsorption properties modifier of the surface of the calcium carbonate particles permitting to obtain aqueous calcium carbonate-containing material suspensions having a pH stable over time, and which can have a high dry solids content and a low and stable Brookfield viscosity.

Without being bound by any theory, the Applicant believes that the use of certain lithium ion-containing compounds modifies the surface of the particles of the calcium carbonate-containing material and consequently modifies the adsorption properties of the surface of the calcium carbonate particle, whatever the nature of the calcium carbonate-containing material is.

Nevertheless, while the presence of these lithium compounds modifies the adsorption properties of the calcium carbonate at this low level of lithium content the incorporation of this element, and especially the below-mentioned lithium compounds has mainly no visible impact on the crystal shape of the pigment under the scanning electron microscope (SEM) pictures and/or the specific surface or XRD pattern of the pigment.

Thus, the above object is achieved by a process for manufacturing calcium carbonate materials having a particle surface with improved adsorption properties of dispersants comprising the steps of:

a. providing at least one calcium carbonate comprising material in the form of an aqueous suspension or in dry form,
b. providing at least one lithium ion containing compound selected from the group consisting of lithium hydroxide or lithium oxide or inorganic and/or organic monomeric lithium salts selected from the group comprising mono- and/or polyvalent acid salts such as lithium carbonate, lithium sulphates, lithium citrate, lithium hydrogen carbonate, lithium acetate, lithium chloride, lithium phosphates, in dry form or in aqueous solution, and mixtures thereof,
c. combining the at least one lithium ion containing compound of step b) with the at least one calcium carbonate material of step a).

The lithium salts of di- or tribasic monomeric acids can also be mixed salts, e.g. of lithium and sodium such as in $(Na,Li)_3PO_4$, e.g. Olympite or Nalipoite.

The resulting calcium carbonate material may be in a dry form or in the form of a suspension. They may be dried or resuspended after having been dried, as can be taken from any of the following preferred embodiments.

The at least one calcium carbonate comprising material for use in the present invention preferably is provided in the form of synthetic calcium carbonate (PCC) obtained from at least one calcium ion source and at least one carbonate, hydrogen carbonate and/or $CO_2$ source, or in the form of a natural carbonate containing mineral material (GCC).

Especially suitable calcium carbonate containing material is selected from the group comprising natural calcium carbonate (GCC) such as marble, calcite, limestone and/or chalk; precipitated calcium carbonate (PCC) like vaterite and/or calcite; and calcium carbonate-containing minerals such as dolomite or mixed carbonate based fillers such as, in particular, calcium associated with magnesium and analogues or derivatives, various matter such as clay or talc or analogues or derivatives, and mixtures thereof such as, for example, talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

Most preferably, the at least one calcium carbonate material is a natural calcium carbonate (GCC) or a precipitated calcium carbonate (PCC) or a mixture of GCC and PCC, or a mixture of GCC and PCC and clay, or a mixture of GCC and PCC and talc, and most preferably is a GCC chosen among marble, chalk, calcite or limestone or a PCC chosen among calcitic PCC like rhombohedral PCC or scalenohedral PCC.

The above process can be improved by a number of optional steps:

Thus, e.g., by grinding and/or dispersing methods at reduced dispersant content and/or increased solid content, manufacturing methods of aqueous suspension of calcium carbonate containing material particles implementing said lithium ion-containing compound selected as adsorption properties modifier of the surface of the calcium carbonate particles, the manufacturing process can be optimized.

An especially preferred embodiment includes a grinding step, wherein the at least one calcium carbonate material is ground, optionally in the presence of dispersants and/or grinding aids (step d).

Dispersants or grinding aids used according to the present invention may be any conventional organic dispersants such as sodium polyacrylate homopolymers and/or copolymers and polymaleinates, etc. They are preferably in the non-neutralised and/or partially neutralized form. Preferred dispersants are, e.g. partially neutralised, totally neutralised, and especially non-neutralized polyacrylic acids. "Non-neutralised" means that all of the carboxylic groups are present as the free acids, while partially neutralised means that a part of the carboxylic acid groups are transformed into a salt, and totally neutralized means that all carboxylic acid groups are neutralised. Neutralized groups may be present in a dissociated, partially dissociated or non-dissociated form.

It is preferred that, in step d), the at least one lithium ion containing compound is present.

If GCC is used in step d), it may be preferred to subject the wet ground natural calcium carbonate to a wet beneficiation step prior to step d), allowing the removal of impurities, such as silicate impurities, for instance by froth flotation.

Furthermore, it can be advantageous that the ground material obtained from step d) is screened and/or concentrated (step e).

"Screening" in the context of the present invention is implemented by the well known devices for "screening" like sieves, grit centrifuges, etc. By "screening", it has to be understood a beneficiation by removing coarse particles having a particle size of more than 45 μm.

"Upconcentration" is conducted, e.g. by a thermal concentration or a mechanical concentration such as by means of a centrifuge, filter-press, tube-press or a mixture thereof.

If the ground material is screened and/or concentrated according to step e), it may be preferred to disperse the material in an aqueous medium subsequent to screening and/or concentrating (step f), wherein it is even more preferred, if dispersing is performed in the presence of the at least one lithium ion containing compound, which can be different or the same as the one used for step d).

The ground material obtained from any one of steps d) or e) or f) may be dried, if the calcium carbonate material of step a) is provided in the form of an aqueous suspension (step g).

On the other hand, if the calcium carbonate material of step a) is provided in the dry form, or when steps e), f) and g) are not performed, the ground material obtained from step d) can be dispersed in an aqueous medium (step h).

In a preferred embodiment, the aqueous suspension obtained from step h may be ground (step i).

Furthermore, the dried material of step g), may be redispersed in an aqueous medium (step j).

In especially preferred embodiments, step i) and/or step j) is performed in the presence of at least one lithium ion-containing compound.

Generally, regarding the addition of the at least one lithium ion-containing compound, there are several preferred embodiments.

For example, the at least one lithium ion-containing compound can be added before and/or during and/or after step a), if the at least one calcium carbonate material is PCC.

Thus, the lithium compound can also be added before, during or after the precipitation of the synthetic calcium carbonate. For example, the lithium compound can be added prior to the carbonisation step.

On the other hand, if the at least one calcium carbonate material is GCC, the at least one lithium ion containing compound is preferably added before and/or during and/or after grinding step d), if steps e) and f) are not carried out.

The at least one lithium ion containing compound may however also be added after grinding step d) and before and/or during and/or after screening and/or concentrating step e), if step e) is performed alone.

Furthermore, it is possible to add the at least one lithium ion containing compound before and/or during and/or after dispersing step f).

If the calcium carbonate material is provided in the dry form in step a) followed successively by steps d) and h), it is preferred that the addition of the lithium ion-containing compound is performed in a single addition before, during or after step d) or is made in multiple additions, each of them before, during or after the step h).

If dispersing step f) is performed and if all or part of the quantity of the lithium ion-containing compound is added before step f), the lithium ion-containing compound is preferably added before and/or during and/or after the step d).

As mentioned above, the aqueous calcium carbonate-containing material suspensions obtained by the process of manufacturing according to the present invention have a good pH buffer capacity, i.e. a pH stable over time, a high dry solid content, and a low Brookfield™ viscosity that remains stable over time.

"A high dry solids content" according to the present invention means an aqueous calcium carbonate containing material suspension or slurry having a solid content of preferably from 10 wt % to 82 wt %, more preferably from 50 wt % to 81 wt % and most preferably of from 65 wt % to 80 wt %, for example from 70 wt % to 78 wt % based on the total weight of the suspension or slurry.

"pH stable over time" in the context of the present invention means that the mineral suspension will keep the pH value in a narrow range of preferably 8.5 to 10.5, more preferably 9 to 10, e.g. 9.5 during preferably at least 6 days, more preferably at least 7 days, most preferably at least 8 days of storage.

Thus, it is especially preferred that step d) of the process of the present invention is performed at a pH of above 7, preferably above 7.5, more preferably between 8.5 and 10.5, and most preferably between 9 and 10, e.g. 9.5.

In this respect, the skilled man will easily determine that the pH value will have suitable values in function of the properties he wishes to achieve, knowing that it is influenced by the addition of a base, preferably of a base of a mono or divalent cation, most preferably of sodium or calcium, e.g. by the addition of an alkaline preparation of a biocide, or by the release of hydroxide, such a $Ca(OH)_2$, during grinding of a material, such as during the co-grinding of precipitated calcium carbonate and natural calcium carbonate.

In all the present application the value of the pH is measured at room temperature (21° C.±1) with an accuracy of ±0.3 pH units.

The at least one lithium ion-containing compound preferably is selected from the group comprising lithium hydroxide or lithium oxide or inorganic and/or organic monomeric lithium salts selected from the group comprising mono- and/or polyvalent acid salts such as lithium carbonate, lithium sulphates, lithium citrate, lithium hydrogen carbonate, lithium acetate, lithium chloride, lithium phosphates, in dry form or in aqueous solution, and mixtures thereof.

The lithium ion concentration in respect to the total dry calcium carbonate preferably is from 10 to 2000 ppm, more preferably 100 to 1000 ppm, most preferably 200 to 800 ppm.

In this respect, the at least one lithium ion-containing compound, which may be added before, during and/or after step d), is preferably present in an amount of from 0.0035 wt % to 1 wt %, preferably from 0.0035 wt % to 0.5 wt %, and most preferably from 0.02 wt % to 0.2 wt %, relative to the total dry calcium carbonate.

Such lithium ion-containing compounds are added to obtain an aqueous suspension of material with a low Brookfield™ viscosity stable over time, that means that the initial Brookfield™ viscosity of the aqueous calcium carbonate-containing mineral material suspension after 1 hour of production preferably is below 4000 mPa·s, more preferably below 2000 mPa·s, most preferably below 500 mPa·s measured after 1 minute of stirring by the use of a DV-III model Brookfield™ viscosimeter at room temperature (21° C.±1) and a rotation speed of 100 rpm (revolutions per minute) with the appropriate spindle of an RV Spindle Set, and that the Brookfield™ viscosity of the aqueous calcium carbonate material suspension after 8 days of unstirred storage is below 4000 mPa·s, preferably below 2000 mPa·s, very preferably below 500 mPa·s measured after 1 minute by the use of a DV-III model Brookfield™ viscosimeter at room temperature (21° C.±1) and a rotation speed of 100 rpm with the appropriate spindle of an RV Spindle Set. It is especially preferred that after unstirred storage for 8 days the viscosity is below 1000 mPa·s, very preferably below 500 mPa·s measured after 1 minute of stirring by the use of a DV-III model Brookfield™ viscosimeter at room temperature (21° C.±1) and a rotation speed of 100 rpm with the appropriate spindle of an RV Spindle Set.

In a preferred embodiment the calcium carbonate material comprises GCC and PCC, wherein the PCC is present in amount of from 10 to 90 wt %, preferably from 20 to 80 wt %, and most preferably from 30 to 70 wt %, based on the total weight of PCC and GCC.

When there is no step e), f) or g), all of the quantity of the at least one lithium ion-containing compound preferably is used before grinding step d), a part of the at least one lithium ion-containing compound is used before grinding step d), while the remaining quantity is added during step d).

Also, a combination of different lithium ion-containing compounds can be advantageously used. When a dispersing agent is used, the amount of the at least one lithium ion containing compound used ranges from 0.01% to 5%, preferably from 0.05% to 2%, most preferably from 0.1% to 1% by dry weight relative to the dry weight of the calcium carbonate material.

Grinding step d) of the process according to the present invention preferably is performed at a temperature of above 5° C., more preferably of from 20° C. to 120° C., for example of from 45° C. to 105° C., for example of from 85° C. to 100° C.

Furthermore, it is preferred that the solids concentration of material in the form of an aqueous suspension to be ground in grinding step d) is from 10 to 82% (by dry weight of calcium carbonate material), preferably from 50 to 81%, most preferably from 60 to 80%, and especially preferably between 65% and 72%.

In a further preferred embodiment of the invention, the ground material obtained from step d) comprises a fraction of particles finer than 1 μm of more than 20 wt %, preferably of more than 60 wt %, even more preferably of more than 75 wt %, and most preferably of more than 85 wt %, especially of more than 95 wt %, based on the total weight of ground material, using a Sedigraph 5100™.

The $d_{50}$ (value of the diameter of 50 w % of the particles, or median particle size) of the ground material preferably is from about 0.2 to 5 µm, preferably from 0.2 to 1.5 µm, and most preferably from 0.25 to 1 µm, for example 0.45 to 0.7 µm. This $d_{50}$ value is determined using a Sedigraph 5100™.

In grinding step d), the calcium carbonate-containing material is preferably provided as an aqueous suspension comprising from 1 to 82 wt %, preferably from 15 wt % to 81 wt %, and most preferably from 40 wt % to 80 wt % of dry GCC and/or PCC, for example 63 wt % to 72 wt % of dry GCC or 47 to 72 wt % of dry PCC. Said aqueous suspension may result from the dispersion of material in the form of a filter-cake.

Especially preferably, step d) is performed at a solids content of from 10 wt % to 35 wt %, based on the total weight of the suspension, in the absence of any dispersants or grinding aids, and is performed at a solids content of from 60 wt % to 82 wt %, based on the total weight of the suspension, in the presence of dispersants and/or grinding aids.

The final solids content of the calcium carbonate containing suspension ranges between 45 wt % and 82 wt %.

Preferably, the calcium carbonate materials have a high final solids content ranges between 45 wt % and 75 wt %, more preferably between 68 wt % and 73 wt %, if grinding step d) is performed without any dispersant nor grinding aid, and ranges between 65 wt % and 82 wt %, preferably between 72 wt % and 78 wt %, if grinding step d) is performed in the presence of dispersants or grinding aids.

Another object of the present invention is the provision of a calcium carbonate containing material obtained by the process according to the invention.

Preferably such calcium carbonate containing materials not only the have the above properties such as a pH stable over time, a high dry solids content and a low and stable Brookfield viscosity, but also have excellent optical properties, e.g. a high capability of scattering visible light.

A measure for the scattering of light is the scattering coefficient S. S should be greater than 110 m²/kg for a coating weight of 20 g/m² reflecting the ability of a coating to scatter visible light. It might be measured e.g. according to the method described in WO 02/49766 (p. 8 to 10). Accordingly, the ability to scatter light is expressed by the Kubelka-Munk light scattering coefficient, determined by the method, well-known to experts, described in the publications of Kubelka and Munk (Zeitschrift für Technische Physik 12,539, (1931)), de Kubelka (J. Optical Soc. Am. 38(5), 448, (1948) et J. Optical Soc. Am. 44(4), 330, (1954)).

It is preferred that the calcium carbonate material obtained by the process of the present invention has a scattering coefficient S of ≥120 m²/kg for a coating weight of 20 g/m² and a Brookfield™ viscosity of <1000 mPa·s, preferably a scattering coefficient S of ≥140 m²/kg for a coating weight of 20 g/m² and a Brookfield™ viscosity of <500 mPa·s.

The lithium ion concentration of such calcium carbonate containing materials in respect to the total dry calcium carbonate preferably is from 10 to 2000 ppm, preferably 100 to 1000 ppm, most preferably 200 to 800 ppm.

It is especially preferred that this material contains at least one lithium ion-containing compound in an amount of from 0.0035 wt % to 1 wt %, preferably from 0.0035 wt % to 0.5 wt %, and most preferably from 0.02 wt % to 0.2 wt %, in particular 0.05%, relative to the total dry calcium carbonate.

Furthermore, the final calcium carbonate containing material may comprise a fraction of particles finer than 1 µm of more than 50 wt %, preferably of more than 80 wt %, more preferably of more than 85 wt %, even more preferably of more than 90 wt %, and most preferably of more than 95 wt %, based on the total weight of ground material.

In a preferred embodiment, the final calcium carbonate containing material has a $d_{50}$ of from about 0.2 to 5 µm, preferably from 0.2 to 1.5 µm, and most preferably from 0.25 to 1 µm, for example 0.45 to 0.7 µm. The $d_{50}$ value is determined using a Sedigraph 5100™.

Ground material in a dry form after step g) preferably comprises calcium carbonate selected from the group comprising natural calcium carbonate (GCC) such as marble, chalk, limestone or calcite or precipitated calcium carbonate (PCC) like vaterite and/or calcite, and calcium carbonate containing minerals such as dolomite or mixed carbonate based fillers such as, in particular, calcium associated with magnesium and analogues or derivatives, various matter such as clay or talc or analogues or derivatives, and mixtures of these fillers, such as, for example talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

Preferably, the material is a GCC or a precipitated calcium carbonate (PCC) or a mixture of GCC and PCC, or a mixture of GCC and PCC and clay, or a mixture of GCC and PCC and talc.

Most preferably, it is a GCC chosen among marble, chalk, calcite or limestone or a PCC chosen among calcitic PCC like rhombohedral PCC or scalenohedral PCC.

The ground material in dry form may also feature a $d_{50}$ of from about 0.2 to 5 µm, preferably from 0.2 to 1.5 µm, and most preferably from 0.25 to 1 µm, for example 0.45 to 0.7 µm.

It is also preferred that it may have a fraction of particles finer than 1 µm of more than 50 wt %, preferably of more than 80 wt %, more preferably of more than 85 wt %, even more preferably of more than 90 wt %, and even more preferably of greater than 95 wt % using a Sedigraph™ 5100.

Finally, another object of the present invention is the use of the aqueous calcium carbonate-containing material suspensions and/or dried calcium carbonate-containing material according to the invention, in any sector making use of mineral material, and notably in the field of paper, paint and plastics and any other field using said suspensions and/or powders, more particularly being used as slurries in paper applications such as paper making and/or paper coating and/or surface treatment of the paper or such as the filler during the manufacture of the paper, cardboard, or analogous sheets. The dried powders are preferably used in plastic and/or paints but also be re-suspended in water to form a suspension again. The use as filler can be direct as composition of filler during manufacture of the paper, cardboard, or analogous sheets or indirect as recycling composite of coating brokes, if the recycling composites of coating brokes are used in the manufacturing process of the paper, cardboard, or analogous sheets.

Especially preferred is the use in paper, paints and plastics.

The papers, the paints and the plastics according to the invention are characterized in that they contain said ground mineral materials according to the invention.

Finally, a further aspect of the present invention is the use of the at least one lithium ion-containing compound in the process for manufacturing calcium carbonate materials having a particle surface with improved adsorption properties according to the present invention.

The figures described below and the examples and experiments serve to illustrate the present invention and should not restrict it in any way.

DESCRIPTION OF THE FIGURES

FIG. 1 shows the XRD patterns of a prior art material according to test 8a.

EXAMPLES

Example 1

This example relates to the preparation of the material to be processed according to the present invention.

All particle sizes and median diameters are measured using Sedigraph™ 5100, Micromeritics.

The Brookfield™ viscosities were measured using a DV-III model Brookfield™ viscosimeter at room temperature (21° C.±1) and stirring at a rotation speed of 100 rpm (revolutions per minute) with the appropriate spindle of an RV Spindle Set.

All weight molecular weights (Mw), number molecular weights (Mn) and corresponding polydispersity and weight fraction below 1500 Dalton of the different polymers are measured as 100 mol % sodium salt at pH 8 according to an aqueous Gel Permeation Chromatography (GPC) method calibrated with a series of five sodium polyacrylate standards supplied by Polymer Standard Service with references PSS-PAA 18 K, PSS-PAA 8K, PSS-PAA 5K, PSS-PAA 4K and PSS-PAA 3K.

The BET specific surface area in $m^2/g$ is measured according to the standard ISO 4652.

The X-ray diffraction (XRD) pattern of modified PCC and GCC is performed according to the following method.

Figure 1:
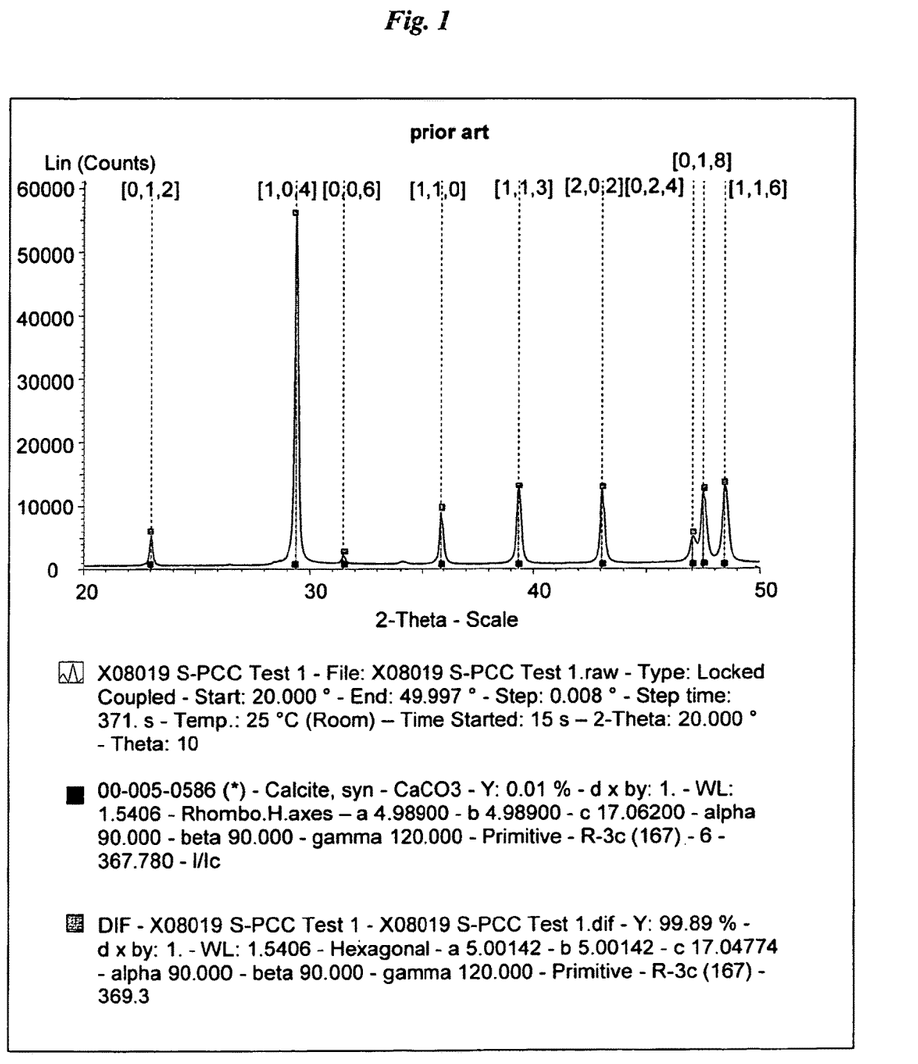
Figure 2:
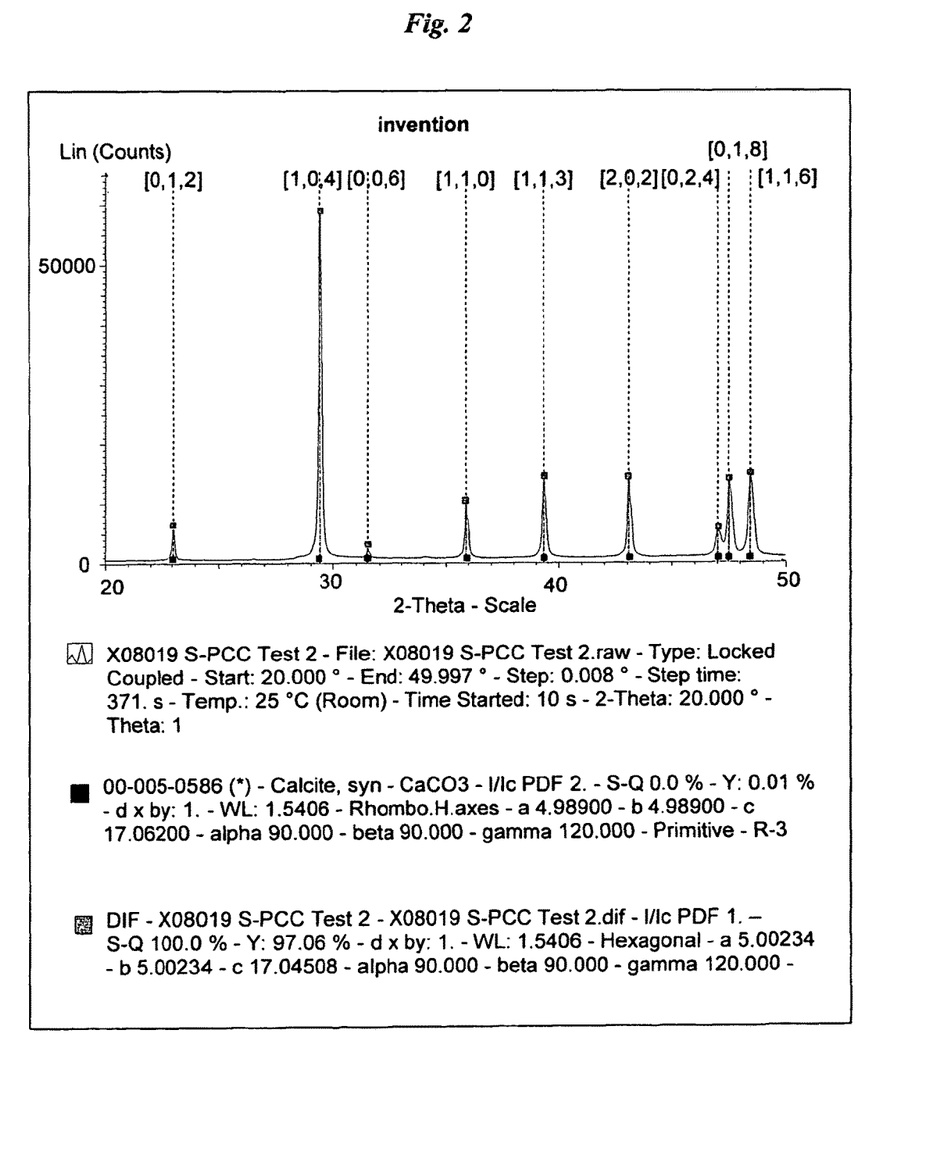
FIG. 2 shows the XRD patterns of an inventive material according to test 8b.

The mineralogical phases present in the above-mentioned calcium carbonates are determined by means of X-ray diffraction (XRD) using a Bruker D8 Advance diffractometer, according to the diffraction powder method. This diffractometer consists of a 2.2 kW X-ray tube, a 9-position sample holder, a Theta-Theta (θ-θ) goniometer, and a VÅNTEC-1 detector. Ni-filtered Cu Kα radiation is employed in all experiments. The profiles are chart recorded automatically using a 0.01° 2θ increment and a 1 s/step scan speed from 20 to 50° 2θ. The resulting powder diffraction patterns are classified by mineral content using the International Center for Diffraction Data (ICDD) powder diffraction file (PDF) database 2. Comparison of the measured data sets with the ICDD reference pattern is demonstrated in FIG. 1 and summarized in Table 1.

TABLE 1

Lattice parameters of measured calcium carbonate powders compared to their corresponding ICDD reference material.

| Sample ID | a in Å | c in Å |
|---|---|---|
| ICDD #05-0586, synthetic calcite | 4.989 | 17.062 |
| Test 8a, S-PCC, prior art | 5.0014 | 17.0477 |
| Test 8b, S-PCC, invention | 5.0023 | 17.0451 |
| ICDD #47-1743, natural calcite | 4.9896 | 17.0610 |
| Test 7b, GCC, invention | 4.9832 | 17.0338 |

Tests 1a and 1b:

This test concerns the preparation of a rhombohedral PCC of a $d_{50}$ of 0.3 μm.

In view of such, 200 kg of calcium oxide (Tagger Kalk, Golling A) are added to 1700 liters of 40° C.-tap water in a stirred reactor; the reactor contents are mixed under continuous stirring for 30 minutes and the resulting slurry of calcium hydroxide ("milk of lime") at 13.1% w/w solids is then screened on a 100 μm screen.

The calcium carbonate precipitation is conducted in a 1800 liter cylindrical stainless steel reactor equipped with an agitator and probes for monitoring the pH and conductivity of the suspension.

1700 liters of the calcium hydroxide suspension obtained in the slaking step as stated above are added to the carbonating reactor and the temperature of the reaction mixture is adjusted to the desired starting temperature of 16° C.

A gas of 20-30% by volume of $CO_2$ in air is then bubbled upwards through the suspension at a rate of 200 $m^3/h$ under a suspension agitation between 200 and 300 rpm. Overpressure in gas feed is 150-200 mbar, corresponding to hydrostatic pressure of $Ca(OH)_2$ suspension in the reactor.

During carbonation, the temperature of the suspension is not controlled and allowed to rise due to the heat generated in the exothermic precipitation reaction. After conductivity reached a minimum gassing is continued for another 4 minutes and then stopped.

The 16.7% w/w solids aqueous slurry of precipitated calcium carbonate obtained by this carbonation step is subsequently screened on a 45 μm screen and fed to a centrifuge for mechanical dewatering. The filter cake discharged by the centrifuge is redispersed in water and made-down into a 47.2% w/w slurry. During shiny make-down 1.0% w/w (calculated as dry matter on dry calcium carbonate) of a sodium polyacrylate-based anionic dispersing aid having an Mw of 12500 and a polydispersity of 2.8 is added to the mixture.

The slurry is then forced to pass through a vertical attritor mill (1.4 liter Dynomill™), containing 0.6-1.2 mm ZrO beads as media, to de-agglomerate the primarily clustered precipitated calcium carbonate into discrete particles in order to obtain an average particle size $d_{50}$ of about 0.3 μm (Micromeritics Sedigraph™ 5100) after milling.

The resulting slurry of discrete ultrafine precipitated calcium carbonate is then further upconcentrated in a vacuum evaporator to obtain final slurry solids of 66.7% w/w solids.

Physical properties of the final product are given in Table 2a below.

TABLE 2a

| PCC suspension solid content (%) | PCC suspension viscosity (mPa · s) (Brookfield DV II, 100 rpm, Spindle 3) | PCC polymorph | d50 (μm) | SSA BET ($m^2/g$) |
|---|---|---|---|---|
| 66.7 | 850 | rhombohedral calcite (R-PCC) | 0.27 | 16.5 |

The mineral slurry so obtained is then spray-dried to a solid content >99.5 weight % (w %) and is named Mineral 1a according to the prior art.

With the same procedure as described above an equivalent R-PCC, but in presence of 2000 ppm by weight of LiOH added prior to the step regarding carbonisation process to the slaked lime.

The resulting slurry of discrete ultrafine precipitated calcium carbonate is then further upconcentrated in a vacuum evaporator to obtain a final slurry solids of 67.7% w/w solids.

Physical properties of the final product are given in Table 2b below.

TABLE 2b

| PCC suspension solid content (%) | PCC suspension viscosity (mPa · s) (Brookfield DV II, 100 rpm, Spindle 3) | PCC polymorph | d50 (μm) | SSA BET (m2/g) |
|---|---|---|---|---|
| 67.7 | 230 | rhombohedral calcite (R-PCC) | 0.29 | 15.8 |

The slurry is then spray-dried >99.5 weight % solids and is named Mineral 1b according to the invention.

Test 2

This test concerns the preparation of a natural ground calcium carbonate from Norway with a $d_{50}$ of 45 μm.

Norwegian marble of the region of Molde with a diameter of 10-300 mm is autogenously dry ground to a fineness of a $d_{50}$ in the range of 42-48 μm. The mineral so obtained is named Mineral 2.

Test 3

This test concerns the preparation of a natural ground calcium carbonate from Norway with a $d_{50}$ of 0.8 μm.

Mineral 2 is wet ground at 20 weight % solids in tap water in a vertical attritor mill (Dynomill™) in a recirculation mode without adding additives, such as dispersing and/or grinding aids to a fineness till 60 weight % of the particle having a diameter <1 μm. After grinding the product has a median diameter $d_{50}$ of 0.8 μm.

After grinding the slurry is concentrated by a tube press to form crumbles of 80-83 weight % solids.

The mineral so obtained is named Mineral 3.

Tests 4a and 4b

These tests concern the preparation of two natural ground calcium carbonates from Norway with a $d_{50}$ of 0.6 μm.

Mineral 2 is wet ground at 15-25 weight % solids in tap water in a vertical attritor mill (Dynomill™) in a recirculation mode without adding additives, such as dispersing and/or grinding aids to a fineness until 75 weight % of the particle having a diameter <1 μm. After grinding the product has a median diameter $d_{50}$ of 0.6 μm. The mineral so obtained is named Mineral 4a.

After grinding the slurry is concentrated by a filter press to form a filter-cake of 69.5 weight % solids.

The mineral so obtained is named Mineral 4b.

Test 5

This test concerns the preparation of a natural ground calcium carbonate from Norway with a $d_{50}$ of 0.4 μm.

Mineral 2 is wet ground at 20 weight % solids in tap water in a vertical attritor mill (Dynomill™) in a recirculation mode without adding additives, such as dispersing and/or grinding aids to a fineness until 85 weight % of the particle having a diameter <1 μm. After grinding the product has a median diameter of 0.4 μm.

After grinding the slurry is concentrated by a tube-press to form a filter-cake of 78 to 80 weight % solids.

The mineral so obtained is named Mineral 5.

Test 6

These tests concern the preparation of a natural ground calcium carbonate from Norway with a $d_{50}$ of 0.6 μm.

Mineral 2 is wet ground at 35 weight % solids in tap water in a vertical attritor mill (Dynomill™) in a recirculation mode by using 0.25 weight % of polyacrylic acid of Mw 6000 and a polydispersity of 2.6 as grinding aid to a fineness until 75 weight % of the particles having a diameter <1 μm. After grinding the product has a median diameter $d_{50}$ of 0.6 μM.

The mineral so obtained is named Mineral 6.

Tests 7a and 7b

This test concerns the preparation of a natural ground calcium carbonate from Italy with a $d_{50}$ of 1.5 μm.

First, Italian Tuscany Marble of Carrara with a diameter of 10-300 mm is crashed in a Jaw Crasher to a diameter of from 0.1-5 mm.

Then, in order to obtain a ground material with a median diameter equal to 1.5 μm, the resulting marble is fed into a Hosokawa™ Ball Mill S.O. 80/32 using 100 kg of Cylpeb iron, barrel-shaped grinding beads with a median diameter of 0.25 mm.

The dry grinding is performed in a continuous manner.

The grinding chamber outflow pass through an opening of 20×6 mm reaching an Alpine Turboplex™ 100 ATP Classifier. The classifier compressor is set to 300 m³/h and the classifier rotation speed and air flow to appropriate values to extract ground material featuring a diameter less than or equal to a given value (hereafter referred to as "valuable material"); all remaining ground material of diameter greater than this given value is re-circulated as feed to the grinder.

The grinding is performed such that 15 kg of material is present in the system at all times. As such, the feed is continuously supplemented with a weight quantity of fresh material corresponding to the valuable material removed from the process in order to maintain 15 kg in the system.

Of note, following start-up and prior to recording the results given below, the grinding system is allowed to run until the quantity of issuing valuable products, and the grinding capacity and grinding energy values are observed to be stable.

The test 7a corresponds to an introduction of the dry grinding additive into the grinding system such that the quantity of sodium carbonate is maintained constant. The mineral so obtained is noted Mineral 7a.

The test 7b corresponds to an introduction of the dry grinding additive into the grinding system such that the quantity of lithium carbonate is maintained constant. The mineral so obtained is noted Mineral 7b.

The results appear in the following table 3.

TABLE 3

| Test | Additive Type | Additive Quantity (ppm) | Air to Classifier in m³/hour | Classifier Rotation Speed (rpm) | Ground Product $d_{50}$ (μm) | Grinding Capacity (kg/h) |
|---|---|---|---|---|---|---|
| 7a | Na$_2$CO$_3$ | 2500 | 150 | 10000 | 1.45 | 5.6 |
| 7b | Li$_2$CO$_3$ | 2500 | 150 | 10000 | 1.55 | 6.5 |

Tests 8a and 8b:

This test concerns the preparation of a scalenohedral PCC of a $d_{50}$ of 2.3 μm.

In view of such, 200 kg of calcium oxide (Tagger Kalk, Golling A) are added to 1700 liters of 40° C.-tap water in a stirred reactor; the reactor contents are mixed under continuous stirring for 30 minutes and the resulting slurry of calcium hydroxide ("milk of lime") at 13.3% w/w solids is then screened on a 100 μm screen.

The calcium carbonate precipitation is conducted in a 1800 liter cylindrical stainless steel reactor equipped with an agitator and probes for monitoring the pH and conductivity of the suspension.

1700 liters of the calcium hydroxide suspension obtained in the slaking step as stated above are added to the carbonating reactor and the temperature of the reaction mixture is adjusted to the desired starting temperature of 50° C.

A gas of 20-30% by volume of $CO_2$ in air is then bubbled upwards through the suspension at a rate of 200 m$^3$/h under a suspension agitation of between 200 and 300 rpm. Overpressure in gas feed is 150-200 mbar, corresponding to hydrostatic pressure of $Ca(OH)_2$ suspension in the reactor.

During carbonation, the temperature of the suspension is not controlled and allowed to rise due to the heat generated in the exothermic precipitation reaction.

After conductivity reached a minimum gassing is continued for another 4 minutes and then stopped.

The product obtained by this carbonation step is subsequently screened on a 45 μm screen and recovered as a 17.4% w/w solids aqueous slurry of precipitated calcium carbonate.

Physical properties of the precipitated calcium carbonate product after carbonation are given in Table 4a below.

TABLE 4a

| PCC suspension solid content (%) | PCC suspension viscosity (mPa·s) (Brookfield DV II, 100 rpm, Spindle 2) | PCC polymorph | d50 (μm) | SSA BET (m2/g) |
|---|---|---|---|---|
| 17.4 | 15 | scalenohedral calcite (S-PCC) | 2.3 | 6.3 |

The mineral slurry so obtained is then spray-dried at a solid content of >99.5 weight % (w %) and is named Mineral 8a according to the prior art.

With the same procedure as described above an equivalent S-PCC but in presence of 2000 ppm by weight of LiOH added prior do the step regarding carbonation process to the slaked lime. The slurry is then spray-dried to >99.5 weight % solids and is named Mineral 8b according to the invention.

Physical properties of the precipitated calcium carbonate product after carbonation are given in below.

TABLE 4b

| PCC suspension solid content (%) | PCC suspension viscosity (mPa·s) (Brookfield DV II, 100 rpm, Spindle 2) | PCC polymorph | d50 (μm) | SSA BET (m2/g) |
|---|---|---|---|---|
| 17.7 | 15 | scalenohedral calcite (S-PCC) | 2.4 | 6.1 |

As can be seen in Table 4a versus Table 4b the presence of LiOH during precipitation had no influence on measured physical properties of the S-PCC.

Example 2

This example illustrates the use of a lithium ion-containing compound as an adsorption properties modifier, which allows achieving aqueous calcium carbonate suspensions with a dry solid concentration that can be high, while having at once a low Brookfield™ viscosity that remains stable over time, and a good pH buffer capacity.

More particularly, this example illustrates the introduction of lithium carbonate after wet grinding in view of modifying adsorption on the surface of the calcium carbonate particle and consequently improving dispersing wet ground marble of median diameter $d_{50}$ of 0.6 μm.

The scattering coefficient S greater than 110 m$^2$/kg for a coating weight of 20 g/m$^2$ reflecting the ability of a coating to scatter visible light is measured according to the method described in WO 02/49766 (p. 8 to 10). Accordingly, the ability to scatter light is expressed by the Kubelka-Munk light scattering coefficient, determined by the method, well-known to experts, described in the publications of Kubelka and Munk (Zeitschrift für Technische Physik 12,539, (1931)), de Kubelka (J. Optical Soc. Am. 38(5), 448, (1948) et J. Optical Soc. Am. 44(4), 330, (1954)).

Test 9:

This test illustrates the prior art.

In order to perform it, 0.9 weight % on dry mineral of a conventional 100 mol % potassium neutralised polyacrylic acid of Mw=6000 are put in the Mineral 6 suspension at 35 w % solids before upconcentrated in the lab in an open loop.

The initial Brookfield viscosity is then measured after one hour of production and after one minute of stirring at room temperature (21° C.±1) and at 100 rpm by the use of a Brookfield viscosimeter type DV-III equipped with the spindle 3.

Test 10:

This test illustrates the invention.

In order to perform it, 0.15 weight % on dry mineral of the same potassium polyacrylate as in Test 9 and 0.33 w % on dry mineral of lithium carbonate is put in the Mineral 6 suspension at 35 w % solids before upconcentrated in the lab in an open loop at a solid content of 69.1 weight %.

The initial Brookfield viscosity is then measured after one hour of production and after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

Test 11:

This test illustrates the invention.

In order to perform it, 0.15 weight % on dry mineral of the same potassium polyacrylate as in Test 9 and 0.33 w % on dry mineral of lithium carbonate is put in the Mineral 6 suspension at 35 w % solids before upconcentrated in the lab in an open loop at a solid content of 71.0 weight %.

The initial Brookfield viscosity is then measured after one hour of production and after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

The results appear in the following Table 5:

TABLE 5

|  | Test number | Solid Content (weight %) | Additive on dry mineral (weight %) | Initial. Brookfield Viscosity 100 rpm. Spindle 3 | 8 days Brookfield Viscosity 100 rpm. Spindle 3 | Scattering $m^2$/kg at 20 g/$m^2$ of coating level |
|---|---|---|---|---|---|---|
| Prior art | 9 | 66.8% | 0.9% | ~1000 mPa·s but sticky | ~1000 mPa·s but sticky | 115 |
| Invention | 10 | 69.1% | 0.085% + 0.33% $Li_2CO_3$ | 210 mPa·s | 280 mPa·s | 167 |
| Invention | 11 | 71.0% | 0.085% + 0.33% $Li_2CO_3$ | 300 mPa·s | 410 mPa·s | 160 |
| Invention | 12 | 72.5% | 0.085% + 0.33% $Li_2CO_3$ | 462 mPa·s | 550 mPa·s | 156 |
| Invention | 13 | 73.7% | 0.085% + 0.33% $Li_2CO_3$ | 695 mPa·s | 830 mPa·s | 148 |

Test 12

This test illustrates the invention.

In order to perform it, 0.15 weight % on dry mineral of the same potassium polyacrylate as in Test 9 and 0.33 w % on dry mineral of lithium carbonate is put in the Mineral 6 suspension at 35 w % solids before upconcentrated in the lab in an open loop at a solid content of 72.5 weight %.

The initial Brookfield viscosity is then measured after one hour of production and after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

Test 13

This test illustrates the invention.

In order to perform it, 0.085 weight % on dry mineral of the same potassium polyacrylate as in Test 9 and 0.33 w % on dry mineral of lithium carbonate (corr. to 625 ppm $Li^+$) is put in the Mineral 6 suspension at 35 w % solids before upconcentrated in the lab in an open loop at a solid content of 73.7 weight %.

The initial Brookfield viscosity is then measured after one hour of production and after one minute of stirring at room temperature (21° C.±1) and at 100 rpm by the use of a Brookfield viscosimeter type DV-III equipped with the spindle 3.

The support in improving adsorption and consequently improving dispersing by the use of lithium ion-containing compound, in particular lithium carbonate is clearly shown by the here-above table at high scattering potential.

Example 3

This example relates to the introduction of a lithium salt in combination with a conventional polymer after the mechanical upconcentration step in view of dispersing a filter-cake issued from an upconcentrated wet ground marble of median diameter $d_{50}$ of 0.6 μm.

Test 14

This test illustrates the prior art.

In order to perform it, the Mineral 4b is dispersed at a solid content of 67.8 weight % using a Pendraulik toothed disc stirrer (speed of 3000 rpm during 5 to 10 minutes) and 0.54 weight % on dry mineral of a conventional 100 mol % potassium neutralised polyacrylic acid of Mw=6000 and of polydispersity of 2.7.

The Brookfield viscosity is then measured at room temperature (21° C.±1) and at 100 rpm by the use of a Brookfield viscosimeter type DV-III equipped with the spindle 3.

Test 15

This test illustrates the prior art.

In order to perform it, the Mineral 4b is dispersed at a solid content of 67.8 weight % using a Pendraulik toothed disc stirrer (speed of 3000 rpm during 5 to 10 minutes) and 0.68 weight % on dry mineral of a conventional 100 mol % potassium neutralised polyacrylic acid of Mw=6000 and of polydispersity of 2.7.

The initial Brookfield viscosity is then measured after one hour of production and after one minute of stirring at room temperature (21° C.±1) and at 100 rpm by the use of a Brookfield viscosimeter type DV-III equipped with the spindle 3.

Test 16

This test illustrates the invention.

In order to perform it, the Mineral 4b is dispersed at a solid content of 70.9 weight % using a Pendraulik toothed disc stirrer (speed of 3000 rpm during 5 to 10 minutes) and 0.23 weight % on dry mineral of a 100 mol % potassium neutralised polyacrylic acid of Mw=6000 and of polydispersity of 2.7 plus 0.28 weight % of lithium carbonate.

The initial Brookfield viscosity is then measured after one hour of production and after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

Two values of pH are measured: the initial pH after one hour of production and the 8 days pH after 8 days of storage.

The results are gathered in the following table 6.

TABLE 6

| | Test number | Solid Content (weight %) | Additive on dry mineral (weight %) | Initial Brookfield Viscosity 100 rpm. Spindle 3 | 8 days Brookfield Viscosity 100 rpm. Spindle 3 | pH 1 hour/ 8 days |
|---|---|---|---|---|---|---|
| Prior art | 14 | 67.8% | 0.54% | >4000 mPa·s | >4000 mPa·s | 9.4/9.3 |
| Prior art | 15 | 67.8% | 0.68% | >4000 mPa·s | >4000 mPa·s | 9.7/9.5 |
| Invention | 16 | 70.9% | 0.23% + 0.28% | 585 mPa·s | 620 mPa·s | 9.6/9.4 |
| Invention | 17 | 70.9% | 0.31% + 0.28% | 166 mPa·s | 172 mPa·s | 9.7/9.7 |
| Invention | 18 | 70.9% | 0.39% + 0.28% | 128 mPa·s | 134 mPa·s | 9.6/9.8 |

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

Two values of pH are measured: the initial pH after one hour of production and the 8 days pH after 8 days of storage.

Test 17

This test illustrates the invention.

In order to perform it, the Mineral 4b is dispersed at a solid content of 70.9 weight % using a Pendraulik toothed disc stirrer (speed of 3000 rpm during 5 to 10 minutes) and 0.31 weight % on dry mineral of a 100 mol % potassium neutralised polyacrylic acid of Mw=6000 and of polydispersity of 2.7 plus 0.28 weight % of lithium carbonate (corr. to 530 ppm Li$^+$).

The initial Brookfield viscosity is then measured after one hour of production and after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

Two values of pH are measured: the initial pH after one hour of production and the 8 days pH after 8 days of storage.

Test 18

This test illustrates the invention.

In order to perform it, the Mineral 4b is dispersed at a solid content of 70.9 weight % using a Pendraulik toothed disc stirrer (speed of 3000 rpm during 5 to 10 minutes) and 0.39 weight % on dry mineral of a 100 mol % potassium neutralised polyacrylic acid of Mw=6000 and of polydispersity of 2.7 plus 0.28 weight % of lithium carbonate.

The initial Brookfield viscosity is then measured after one hour of production and after one minute of stirring at room temperature (21° C.±1) and at 100 rpm by the use of a Brookfield viscosimeter type DV-III equipped with the spindle 3.

The Brookfield viscosity after 8 days of storage at room temperature (21° C.±1) without stirring is measured after one minute of stirring at room temperature (21° C.±1) and at 100 rpm by the use of a Brookfield viscosimeter type DV-III equipped with the spindle 3.

Two values of pH are measured: the initial pH after one hour of production and the 8 days pH after 8 days of storage.

The results are gathered in the following table 6.

The table shows clearly, by comparison between a conventional polymer and a lithium carbonate combined with the same conventional polymer, the efficiency of the process using lithium carbonate in order to disperse a filter-cake issued from an upconcentrated wet ground marble of median diameter $d_{50}$ of 0.6 μm.

Example 4

This example illustrates the use of lithium carbonate in dry grinding and preparation of a high solids suspension of the dry ground calcium carbonate.

Test 19

This test illustrates the prior art.

In order to perform it, the Mineral 7a is dispersed at a solid content of 68.5 weight % using a Pendraulik toothed disc stirrer (speed of 3000 rpm during 5 to 10 minutes) and 0.23 weight % on dry mineral of a 100 mol % sodium neutralised polyacrylic acid of Mw=3500 and of polydispersity of 2.9.

The initial Brookfield viscosity is then measured after one hour of production and after one minute of stirring at room temperature (21° C.±1) and at 100 rpm by the use of a Brookfield viscosimeter type DV-III equipped with the spindle 3.

Test 20

This test illustrates the invention.

In order to perform it, the Mineral 7b is dispersed at a solid content of 68.5 weight % using a Pendraulik toothed disc stirrer (speed of 3000 rpm during 5 to 10 minutes) and 0.23 weight % on dry mineral of a 100 mol % sodium neutralised polyacrylic acid of Mw=3500 and of polydispersity of 2.9.

The initial Brookfield viscosity is then measured after one hour of production and after one minute of stirring at room temperature (21° C.±1) and at 100 rpm by the use of a Brookfield viscosimeter type DV-III equipped with the spindle 3.

The results are gathered in the following table 7.

TABLE 7

| Test number | Solid Content (weight %) | Dispersant on dry mineral (weight %) | Initial Brookfield Viscosity 100 rpm. Spindle 3 | After 8 days Brookfield Viscosity 100 rpm. Spindle 3 | pH 1 hour/ 8 days |
|---|---|---|---|---|---|
| Prior art 19 | 68.5% | 0.23% | 1384 mPa · s | 2140 mPa · s | 10.2/9.9 |
| Invention 20 | 68.5% | 0.23% | 609 mPa · s | 720 mPa · s | 10.1/9.9 |

The use of $Li_2CO_3$ shows the advantage over the use of prior art $Na_2CO_3$ added during dry grinding.

Example 5

This example illustrates the use of different lithium salts for the preparation of a high solids suspension of natural, ground calcium carbonate.

Test 21

This test illustrates the prior art

In order to perform it, 602 grams of the Mineral 4b are dispersed at a solid content of 66.5 weight % using a Pendraulik toothed disc stirrer (speed of 3000 rpm during 5 to 10 minutes) and using different quantities of a 70 mol % sodium 30 mol % calcium neutralised polyacrylic acid of Mw=6000 and of polydispersity of 2.6.

The initial Brookfield viscosity is then measured after one hour of production and after one minute of stirring at room temperature (21° C.±1) and at 100 rpm by the use of a Brookfield viscosimeter type DV-III equipped with the spindle 4.

Result:

| Slurry solids | dispersant content | Initial Brookfield Viscosity |
|---|---|---|
| 66.8 weight % | 0.35 weight % (dry on dry) | 3600 mPa · s |
| 66.8 weight %, | 0.99 weight % (dry on dry) | 3050 mPa · s |
| 66.8 weight %. | 1.60 weight % (dry on dry) | 3200 mPa · s |

Test 22

This test illustrates the invention.

In order to perform it, 602 grams of the Mineral 4b are dispersed at a solid content of 67.5 weight % using a Pendraulik toothed disc stirrer (speed of 3000 rpm during 5 to 10 minutes) using the following "preparation additive A":

76.14 g of a 32 weight % solution of a 70 mol % sodium 30 mol % calcium neutralised polyacrylic acid of Mw=6000 and of polydispersity of 2.6 were blend with 42.6 g of a 23.5 weight % $Li_2SO_4$ solution to form the clear solution of "preparation additive A".

The initial Brookfield viscosity is then measured after one hour of production and after one minute of stirring at room temperature (21° C.±1) and at 100 rpm by the use of a Brookfield viscosimeter type DV-HI equipped with the spindle 3.

Preparation Additive A

| Slurry solids | content | Brookfield Viscosity |
|---|---|---|
| 67.5 weight %, | 0.39 weight % (dry on dry) | 367 mPa · s |
| 67.5 weight %. | 0.65 weight % (dry on dry) | 81 mPa · s |

Test 23

This test illustrates the invention.

In order to perform it, 602 gram of the Mineral 4b is dispersed at a solid content of 67.5 weight % using a Pendraulik toothed disc stirrer (speed of 3000 rpm during 5 to 10 minutes) using the following "preparation additive B":

134 g of a 32 weight % solution of a 70 mol % sodium 30 mol % calcium neutralised polyacrylic acid of Mw=6000 and of polydispersity of 2.6 are blend with 70 g Lithium citrate to form the "preparation additive B", which is a clear solution having slight turbidity after storage.

The initial Brookfield viscosity is then measured after one hour of production and after one minute of stirring at room temperature (21° C.±1) and at 100 rpm by the use of a Brookfield viscosimeter type DV-III equipped with the spindle 3.

Preparation Additive B

| Slurry solids | content | Initial Brookfield Viscosity |
|---|---|---|
| 67.5 weight %, | 0.44 weight % (dry on dry) | 321 mPa · s |
| 67.5 weight %. | 0.69 weight % (dry on dry) | 82 mPa · s |

Example 6

This example illustrates the use of high polydispersity polyacrylate in combination with lithium salts for the preparation of a high solids suspension of natural, ground calcium carbonate.

To obtain a high polydispersity sodium polyacrylate the following sodium polyacrylates are blend to form "preparation additive C":

100 g of a 100 mol % sodium neutralised polyacrylic acid of Mw=6000 and of polydispersity of 2.6 and a fraction of 18 to 20 weight %<1500 Dalton and 100 g of a 100 mol % sodium neutralised polyacrylic acid of Mw=3500 and of polydispersity of 2.4 and a fraction of 28 to 30 weight %<1500 Dalton.

and 100 g of a 100 mol % sodium neutralised polyacrylic acid of Mw=1200 and of polydispersity of 2.8 and a fraction of >70 weight %<1500 Dalton.

The corresponding "preparation additive C" has a Mw=3600 and of polydispersity of 2.8 and a fraction of 34 to 36 weight %<1500 Dalton.

Test 24

This test illustrates the prior art.

In order to perform them, the Mineral 7a is dispersed at a solid content of 66 weight % using a Pendraulik toothed disc stirrer (speed of 3000 rpm during 5 to 10 minutes) and different amount in respect to weight % on dry matter of "preparation additive C" was used to control the Brookfield viscosity. The initial Brookfield viscosity is then measured after one hour of production and after one minute of stirring at room temperature (21° C.±1) and at 100 rpm by the use of a Brookfield viscosimeter type DV-III equipped with the spindle 3.
Result:

| Slurry solids | dispersant content | Initial Brookfield Viscosity |
|---|---|---|
| 66.8 weight % | 0.35 weight % (dry on dry) | >5000 mPa · s |
| 66.8 weight %, | 1.0 weight % (dry on dry) | >5000 mPa · s |
| 66.8 weight %. | 1.60 weight % (dry on dry) | >5000 mPa · s |

Test 25

This test illustrates the invention.

In order to perform them, the Mineral 7a is dispersed at a solid content of 66 weight % using a Pendraulik toothed disc stirrer (speed of 3000 rpm during 5 to 10 minutes) and different amount in respect to weight % on dry matter of "preparation additive C" in combination with lithium carbonate was used to control the Brookfield viscosity. The initial Brookfield viscosity is then measured after one hour of production and after one minute of stirring at room temperature (21° C.±1) and at 100 rpm by the use of a Brookfield viscosimeter type DV-III equipped with the spindle 3.
Result:

| Slurry solids | "preparation additive C" | Li salt (Li$_2$CO$_3$) | Brookfield Viscosity |
|---|---|---|---|
| 65.8 weight % | 0.3 weight % | 0.35 weight % | ~2600 mPa · s |
| 65.6 weight %, | 0.6 weight % | 0.35 weight % | 476 mPa · s |
| 64.8 weight %. | 0.9 weight % | 0.35 weight % | 280 mPa · s |

Test 26

This test illustrates the prior art.

In order to perform them, the Mineral 4b is dispersed at a solid content of 55 weight % using a Pendraulik toothed disc stirrer (speed of 3000 rpm during 5 to 10 minutes) and 1.05 weight % on dry matter of sodium magnesium polyacrylate having an Mw 1500, and a fraction >1500 of 65 weight % was used to control the Brookfield viscosity. The initial Brookfield viscosity is then measured after one hour of production and after one minute of stirring at room temperature (21° C.±1) and at 100 rpm by the use of a Brookfield viscosimeter type DV-III equipped with the spindle 3.
Result:

| Slurry solids | dispersant content | Initial Brookfield Viscosity |
|---|---|---|
| 55.4 weight % | 1.0 weight % (dry on dry) | 1250 mPa · s |
| 60.0 weight % | 1.0 weight % (dry on dry) | >5000 mPa · s |

Test 27

This test illustrates the invention

In order to perform them, the Mineral 4b is dispersed at a solid content of 60 weight % using a Pendraulik toothed disc stirrer (speed of 3000 rpm during 5 to 10 minutes) and 0.45 weight % on dry matter of sodium magnesium polyacrylate having an Mw 1500, and a fraction >Mw1500 of 65 weight % was used to control the Brookfield viscosity in combination with 0.5 weight % in respect to dry matter on calcium carbonate of lithium carbonate. The initial Brookfield viscosity is then measured after one hour of production and after one minute of stirring at room temperature (21° C.±1) and at 100 rpm by the use of a Brookfield viscosimeter type DV-III equipped with the spindle 3.
Result:

| Slurry solids | dispersant content | Initial Brookfield Viscosity |
|---|---|---|
| 61.6 weight % | 0.40 weight % (dry on dry) | 82 mPa · s |

Example 7

This example illustrates the use of a lithium ion-containing compound as an adsorption properties modifier, which allows achieving aqueous S-PCC suspensions with a dry solid concentration that can be high, while having at once a low Brookfield™ viscosity that remains stable over time, and a good pH buffer capacity.

Test 28

This test illustrates the prior art.

In order to perform it, the Mineral 8a is dispersed at a solid content of 50.0 weight % using a Pendraulik toothed disc stirrer (speed of 3000 rpm during 5 to 10 minutes) and 0.44 weight % on dry mineral of a conventional 100 mol % sodium-magnesium (ratio 1:1) neutralised polyacrylic acid of Mw=6000 and of polydispersity of 2.7.

The Brookfield viscosity is then measured at room temperature (21° C.±1) and at 100 rpm by the use of a Brookfield viscosimeter type DV-III equipped with the spindle 3.

Test 29

This test illustrates the prior art.

In order to perform it, the Mineral 8a is dispersed at a solid content of 60.1 weight % using a Pendraulik toothed disc stirrer (speed of 3000 rpm during 5 to 10 minutes) and 1.50 weight % on dry mineral of a conventional 100 mol % sodium-magnesium (ratio 1:1) neutralised polyacrylic acid of Mw=6000 and of polydispersity of 2.7.

The Brookfield viscosity is then measured at room temperature (21° C.±1) and at 100 rpm by the use of a Brookfield viscosimeter type DV-III equipped with the spindle 3.

Test 30

This test illustrates the prior art.

In order to perform it, the Mineral 8a is dispersed at a solid content of 50.0 weight % using a Pendraulik toothed disc stirrer (speed of 3000 rpm during 5 to 10 minutes) and 0.30 weight % on dry mineral of a conventional 100 mol % sodium neutralised polyacrylic acid of Mw=3500.

The Brookfield viscosity is then measured at room temperature (21° C.±1) and at 100 rpm by the use of a Brookfield viscosimeter type DV-III equipped with the spindle 3.

Test 31

This test illustrates the prior art.

In order to perform it, the Mineral 8a is dispersed at a solid content of 55.6 weight % using a Pendraulik toothed disc stirrer (speed of 3000 rpm during 5 to 10 minutes) and 0.30 weight % on dry mineral of a conventional 100 mol % sodium neutralised polyacrylic acid of Mw=3500.

The Brookfield viscosity is then measured at room temperature (21° C.±1) and at 100 rpm by the use of a Brookfield viscosimeter type DV-III equipped with the spindle 3.

It has to be noted that a 60.0 weight % solid has been impossible to achieve due to a too much high Brookfield viscosity.

Test 32

This test illustrates the invention.

In order to perform it, the Mineral 8b is dispersed at a solid content of 50.0 weight % using a Pendraulik toothed disc stirrer (speed of 3000 rpm during 5 to 10 minutes) and 0.22 weight % on dry mineral of a conventional 100 mol % sodium-magnesium (ratio 1:1) neutralised polyacrylic acid of Mw=6000 and of polydispersity of 2.7.

The Brookfield viscosity is then measured at room temperature (21° C.±1) and at 100 rpm by the use of a Brookfield viscosimeter type DV-III equipped with the spindle 3.

Test 33

This test illustrates the invention.

In order to perform it, the Mineral 8b is dispersed at a solid content of 59.5 weight % using a Pendraulik toothed disc stirrer (speed of 3000 rpm during 5 to 10 minutes) and 0.46 weight % on dry mineral of a conventional 100 mol % sodium-magnesium (ratio 1:1) neutralised polyacrylic acid of Mw=6000 and of polydispersity of 2.7.

The Brookfield viscosity is then measured at room temperature (21° C.±1) and at 100 rpm by the use of a Brookfield viscosimeter type DV-III equipped with the spindle 3.

Test 34

This test illustrates the invention.

In order to perform it, the Mineral 8b is dispersed at a solid content of 49.9 weight % using a Pendraulik toothed disc stirrer (speed of 3000 rpm during 5 to 10 minutes) and 0.32 weight % on dry mineral of a conventional 100 mol % sodium neutralised polyacrylic acid of Mw=3500.

The Brookfield viscosity is then measured at room temperature (21° C.±1) and at 100 rpm by the use of a Brookfield viscosimeter type DV-III equipped with the spindle 3.

Test 35

This test illustrates the invention.

In order to perform it, the Mineral 8b is dispersed at a solid content of 59.4 weight % using a Pendraulik toothed disc stirrer (speed of 3000 rpm during 5 to 10 minutes) and 0.53 weight % on dry mineral of a conventional 100 mol % sodium neutralised polyacrylic acid of Mw=3500.

The Brookfield viscosity is then measured at room temperature (21° C.±1) and at 100 rpm by the use of a Brookfield viscosimeter type DV-III equipped with the spindle 3.

The results are gathered in the following table 8.

TABLE 8

| | Test number | Solid content (weight %) | Additive on dry mineral (weight %) | Initial Viscosity Brookfield 100 rpm. Spindle 3 | pH 1 h/8 d |
|---|---|---|---|---|---|
| Prior art | 28 | 50.0% | 0.44% | 113 mPa · s | 10.2/10.4 |
| Prior art | 29 | 60.1% | 1.50% | >4000 mPa · s | 10.3/10.4 |
| Prior art | 30 | 50.0% | 0.30% | 95 mPa · s | 9.9/10.2 |
| Prior art | 31 | 55.6% | 0.59% | 103 mPa · s | 10./10.2 |
| Invention | 32 | 50.0% | 0.22% | 53 mPa · s | 10.2/10.2 |
| Invention | 33 | 59.5% | 0.46% | 94 mPa · s | 9.9/10.2 |
| Invention | 34 | 49.9% | 0.32% | 39 mPa · s | 10.2/10.4 |
| Invention | 35 | 59.4% | 0.53% | 104 mPa · s | 10.1/10.4 |

The reading of the table 8 demonstrates clearly the efficiency of the inventive modification of S-PCC using lithium ion.

Example 8

This example illustrates the use of a lithium ion-containing compound as an adsorption properties modifier, which allows achieving aqueous calcium carbonate suspensions with a dry solid concentration that is high, while having at once a low Brookfield™ viscosity that remains stable over time, and a good pH buffer capacity.

More particularly, this example illustrates the introduction of lithium carbonate during high solids wet grinding.

Test 36:

This test illustrates the prior art.

In order to perform it, Mineral 2 was dispersed at 76 weight % solids using 0.55 weight % dry on dry of a common sodium magnesium polyacrylate, Mw 6000, polydispersity (Mw/Mn) of 2.5 and wet ground in a 1.5 liter attritor mill median (Dynomill) in recirculation to a median diameter $d_{50}$ of 0.85 µm, 91 weight %<2 µm, 63 weight %<1 µm, 21 weight %<0.2 µm.

The initial Brookfield viscosity after grinding is then measured after one hour of production and after one minute of stirring at room temperature (21° C.±1) and at 100 rpm by the use of a Brookfield viscosimeter type DV-III equipped with the spindle 3.

Test 37:

This test illustrates the invention.

In order to perform it, Mineral 2 was dispersed at 78 weight % solids using 0.55 weight % dry on dry of a common sodium magnesium polyacrylate, Mw6000, polydispersity (Mw/Mn) of 2.5 and 500 ppm of Li ions as $Li_2CO_3$ then wet ground in a 1.5 liter attritor mill median (Dynomill) in recirculation to a median diameter $d_{50}$ of 0.87 µm, 90 weight %<2 µm, 62 weight %<1 µm, 22 weight %<0.2 µm.

The initial Brookfield viscosity after grinding is then measured after one hour of production and after one minute of stirring at room temperature (21° C.±1) and after long term storage at 60° C. at 100 rpm by the use of a Brookfield viscosimeter type DV-III equipped with the spindle 3.

Test 38:

This test illustrates the invention.

In order to perform it, Mineral 2 was dispersed at 76 weight % solids using 0.55 weight % dry on dry of a common sodium magnesium polyacrylate, Mw6000, polydispersity (Mw/Mn) of 2.5 and 500 ppm of Li ions as $LiOHxH_2O$ then wet ground in a 1.5 liter attritor mill median (Dynomill) in recirculation to a median diameter $d_{50}$ of 0.81 µm, 93 weight %<2 µm, 65 weight %<1 µm, 23 weight %<0.2 µm.

The initial Brookfield viscosity after grinding is then measured after one hour of production and after one minute of stirring at room temperature (21° C.±1) and after long term storage at 60° C. and measured at 20° C. at 100 rpm by the use of a Brookfield viscosimeter type DV-III equipped with the spindle 3. The The results appear in the following Table 9

TABLE 9

| | Test number | Solid Content (wt %) | Additive on dry mineral (wt %) | Initial. Brookfield Viscosity 100 rpm. Spindle 3 | 15 days Brookfield Viscosity 100 rpm. Spindle 3 | 30 days Brookfield Viscosity 100 rpm. Spindle 3 |
|---|---|---|---|---|---|---|
| Prior art | 36 | 76.8% | 0.55% | 240 mPa·s | 300 mPa·s | 420 mPa·s |
| Invention | 37 | 79.2% | 0.55% + 500 ppm Li as $Li_2CO_3$ | 205 mPa·s | 155 mPa·s | 135 mPas |
| Invention | 38 | 76.5% | 0.55% + 500 ppm Li as $LiOH \times H_2O$ | 225 mPa·s | 220 mPa·s | 225 mPa·s |

Example 9

This example illustrates the use of a lithium ion-containing compound as an adsorption properties modifier, which allows to achieve aqueous calcium carbonate suspensions with a dry solid concentration that is high, while having at once a low Brookfield™ viscosity that remains stable over time, and a good pH buffer capacity as well as a good scattering potential compared to other alkali carbonate additions.

More particularly, this example illustrates the introduction of lithium carbonate after high solids wet grinding using 0.55 weight % dry on dry of a common sodium magnesium polyacrylate, Mw6000, polydispersity (Mw/Mn) of 2.5 in view of modifying adsorption on the surface of the calcium carbonate particle and consequently improving dispersing wet ground marble of median diameter $d_{50}$ of 0.8 µm, corresponding to 91 weight %<2 µm, 63 weight %<1 µm, 21 weight %<0.2 µm. The solids of the suspension during grinding was 63 weight %.→Mineral Suspension (A)

The scattering coefficient S greater than 110 m²/kg for a coating weight of 20 g/m² reflecting the ability of a coating to scatter visible light is measured according to the method described in WO 02/49766 (p. 8 to 10). Accordingly, the ability to scatter light is expressed by the Kubelka-Munk light scattering coefficient, determined by the method, well-known to experts, described in the publications of Kubelka and Munk (Zeitschrift für Technische Physik 12,539, (1931)), de Kubelka (J. Optical Soc. Am. 38(5), 448, (1948) et J. Optical Soc. Am. 44(4), 330, (1954)).

Test 39:
This test illustrates the prior art.
To this Mineral suspension (A) 1.3 weight % $K_2CO_3$ was added as powder under stirring for 5 min.
Brookfield viscosity is then measured after one minute of stirring at room temperature (21° C.±1) and at 100 rpm by the use of a Brookfield viscosimeter type DV-III equipped with the spindle 3. Further the viscosity and scattering potential was measured after storage.

Test 40:
This test illustrates the prior art.
To this suspension (A) 1.0 weight % $Na_2CO_3$ was added as powder under stirring for 5 min.
Brookfield viscosity is then measured after one minute of stirring at room temperature (21° C.±1) and at 100 rpm by the use of a Brookfield viscosimeter type DV-III equipped with the spindle 3. Further the viscosity and scattering potential was measured after storage.

Test 41:
This test illustrates the invention.
To this suspension (A) 0.7 weight % $Li_2CO_3$ was added as powder under stirring for 5 min.
Brookfield viscosity is then measured after one minute of stirring at room temperature (21° C.±1) and at 100 rpm by the use of a Brookfield viscosimeter type DV-III equipped with the spindle 3. Further the viscosity and scattering potential was measured after storage.

The results appear in the following Table 10.

TABLE 10

| | Test number | Solid Content (wt %) | Additive on dry mineral (wt %) | Scattering m²/kg at 20 g/m² of coating level | 15 days Brookfield Viscosity 100 rpm. Spindle 3 | 30 days Brookfield Viscosity 100 rpm. Spindle 3 |
|---|---|---|---|---|---|---|
| Prior art Reference without alkali carbonate | Mineral Suspension (A) | 62.8% | no alkali carbonate added | 107 | 38 mPa·s | 37 mPa·s |
| Prior art | 39 | 62.8% | 1.3 wt % of $K_2CO_3$ | 124 | Not measurable, very sticky | Not measurable, very sticky |
| Prior art | 40 | 62.8% | 1.0 wt % of $Na_2CO_3$ | 120 | Not measurable, very sticky | Not measurable, very sticky |
| Invention | 41 | 62.8% | 0.7 wt % of $Li_2CO_3$ | 126 | 455 mPa·s | 547 mPa·s |

Using the inventive Li salt the scattering potential can be improved vs. standard product and good viscosity over time.

The invention claimed is:

1. A process for manufacturing a calcium carbonate material comprising the steps of:
   a. providing at least one calcium carbonate material in the form of an aqueous suspension or in dry form,
   b. providing at least one lithium ion containing compound selected from the group consisting of lithium hydroxide, lithium oxide, an inorganic monomeric lithium salt, an organic monomeric lithium salt, lithium carbonate, a lithium sulphate, lithium citrate, lithium hydrogen carbonate, lithium acetate, lithium chloride, and a lithium phosphate, in dry form or in aqueous solution, or any mixture thereof,
   c. combining the at least one lithium ion containing compound of step (b) with the at least one calcium carbonate material of step (a), so that the lithium ion concentration in respect to total dry calcium carbonate is from 10 to 2000 ppm, and
   d. subjecting the material from step (c) to one or more of grinding, dispersing and upconcentrating steps to obtain a calcium carbonate material, wherein a totally neutralized polyacrylic acid dispersing agent is introduced in step (a) and/or step (c) that is not the lithium ion containing compound, wherein the solids content of the calcium carbonate material is from 45 wt % to 82 wt %, and wherein the calcium carbonate material has a Brookfield™ viscosity after 1 hour of production of below 2000 mPa·s measured for one minute of stirring at 21° C. at a rotation speed of 100 rpm, and a Brookfield™ viscosity after 8 days of unstirred storage of below 2000 mPa·s measured for one minute of stirring at 21° C. at a rotation speed of 100 rpm.

2. The process according to claim 1, wherein the at least one calcium carbonate material is provided in the form of precipitated calcium carbonate (PCC) obtained from at least one calcium ion source and at least one carbonate, hydrogen carbonate and/or $CO_2$ source, or in the form of a natural carbonate containing mineral material (GCC).

3. The process according to claim 1, wherein the at least one calcium carbonate material comprises natural calcium carbonate (GCC), marble, calcite, limestone and/or chalk, precipitated calcium carbonate (PCC), vaterite and/or calcite, dolomite or a mixed carbonate based filler, calcium associated with magnesium and analogues or derivatives, clay or talc or analogues or derivatives, or any mixture thereof, talc-calcium carbonate, calcium carbonate-kaolin, or a mixture of natural calcium carbonate with aluminium hydroxide, mica or with synthetic or natural fibres, or a co-structure of minerals, a talc-calcium carbonate co-structure, or a talc-titanium dioxide co-structure.

4. The process according to claim 1, wherein the at least one calcium carbonate material is a natural calcium carbonate (GCC), a precipitated calcium carbonate (PCC), a mixture of GCC and PCC, a mixture of GCC, PCC and clay, or a mixture of GCC, PCC and talc.

5. The process according to claim 1, wherein the at least one calcium carbonate material is natural calcium carbonate (GCC) selected from marble, chalk, calcite or limestone.

6. The process according to claim 1, wherein the at least one calcium carbonate material is precipitated calcium carbonate (PCC) selected from calcitic, rhombohedral or scalenohedral PCC.

7. The process according to claim 1, wherein in step (a) the at least one calcium carbonate material is wet or dry ground before being combined with the at least one lithium ion containing compound in step (c).

8. The process according to claim 7, wherein the at least one calcium carbonate material is ground in the presence of a dispersant and/or grinding aid.

9. The process according to claim 1, wherein the at least one calcium carbonate material of step (a) is wet ground before being combined with the at least one lithium ion containing compound in step (c).

10. The process according to claim 1, wherein the at least one calcium carbonate material of step (a) is wet ground and upconcentrated before being combined with the at least one lithium ion containing compound in step (c).

11. The process according to claim 1, wherein the at least one calcium carbonate material of step (a) is wet ground, screened and upconcentrated before being combined with the at least one lithium ion containing compound in step (c).

12. The process according to claim 1, wherein in step (d) the at least one lithium ion containing compound and the at least one calcium carbonate material are ground.

13. The process according to claim 12, wherein the ground material is subjected to one or more of screening, upconcentrating, dispersion, drying and/or redispersion steps.

14. The process according to claim 12, wherein the at least one calcium carbonate material and the at least one lithium compound are ground at a pH of above 7.

15. The process according to claim 12, wherein the at least one calcium carbonate material and the at least one lithium compound are ground at a pH of above 7.5.

16. The process according to claim 12, wherein the at least one calcium carbonate material and the at least one lithium compound are ground at a pH of between 8.5 and 10.5.

17. The process according to claim 12, wherein the at least one calcium carbonate material and the at least one lithium compound are ground at a pH of between 9 and 10.

18. The process according to claim 12, wherein the at least one lithium ion containing compound and the at least one calcium carbonate material are ground at a temperature of above 5° C.

19. The process according to claim 12, wherein the at least one lithium ion containing compound and the at least one calcium carbonate material are ground at a temperature of from 20° C. to 120° C.

20. The process according to claim 12, wherein the at least one lithium ion containing compound and the at least one calcium carbonate material are ground at a temperature of from 45° C. to 105° C.

21. The process according to claim 12, wherein the at least one lithium ion containing compound and the at least one calcium carbonate material are ground at a temperature of from 85° C. to 100° C.

22. The process according to claim 12, wherein the at least one calcium carbonate material and the at least one lithium compound are ground in an aqueous suspension at a solids concentration of from 10 to 82% by dry weight of calcium carbonate material.

23. The process according to claim 12, wherein the at least one calcium carbonate material and the at least one lithium compound are ground in an aqueous suspension at a solids concentration of from 50 to 81% by dry weight of calcium carbonate material.

24. The process according to claim 12, wherein the at least one calcium carbonate material and the at least one lithium compound are ground in an aqueous suspension at a solids concentration of from 60 to 80% by dry weight of calcium carbonate material.

25. The process according to claim 12, wherein the at least one calcium carbonate material and the at least one lithium compound are ground in an aqueous suspension at a solids concentration of from 65 to 72% by dry weight of calcium carbonate material.

26. The process according to claim 12, wherein the ground material obtained comprises a fraction of particles finer than 1 µm of more than 20 wt %, based on the total weight of ground material.

27. The process according to claim 12, wherein the ground material obtained comprises a fraction of particles finer than 1 µm of more than 60 wt %, based on the total weight of ground material.

28. The process according to claim 12, wherein the ground material obtained comprises a fraction of particles finer than 1 µm of more than 75 wt %, based on the total weight of ground material.

29. The process according to claim 12, wherein the ground material obtained comprises a fraction of particles finer than 1 µm of more than 85 wt %, based on the total weight of ground material.

30. The process according to claim 12, wherein the ground material obtained comprises a fraction of particles finer than 1 µm of more than 95 wt %, based on the total weight of ground material.

31. The process according to claim 12, wherein the grinding is performed at a solids content of from 10 wt % to 35 wt % based on the total weight of the suspension, in the absence of any dispersants or grinding aids, and is performed at a solids content of from 60 wt % to 82 wt %, based on the total weight of the suspension, in presence of dispersants and/or grinding aids.

32. The process according to claim 12, wherein the solids content of the calcium carbonate material is 45 wt % to 82 wt %, if grinding is performed without any dispersant or grinding aid, and is 65 wt % to 82 wt %, if grinding is performed in the presence of dispersants or grinding aids.

33. The process according to claim 12, wherein the solids content of the calcium carbonate material is 45 wt % to 75 wt %, if grinding is performed without any dispersant or grinding aid, and is 65 wt % to 82 wt %, if grinding is performed in the presence of dispersants or grinding aids.

34. The process according to claim 12, wherein the solids content of the calcium carbonate material is 68 wt % to 73 wt %, if grinding is performed without any dispersant or grinding aid, and is 72 wt % to 78 wt %, if grinding is performed in the presence of dispersants or grinding aids.

35. The process according to claim 1, wherein in step (d) the at least one lithium ion containing compound and the at least one calcium carbonate material are dispersed.

36. The process according to claim 35, wherein the dispersed material is subjected to one or more of screening, upconcentrating, dispersion, drying and/or redispersion steps.

37. The process according to claim 1, wherein the at least one lithium ion containing compound is combined with the at least one calcium carbonate material by single or multiple additions of the at least one lithium ion containing compound.

38. The process according to claim 1, wherein the lithium ion concentration in respect to the total dry calcium carbonate is from 100 to 1000 ppm.

39. The process according to claim 1, wherein the lithium ion concentration in respect to the total dry calcium carbonate is from 200 to 800 ppm.

40. The process according to claim 1, wherein the at least one lithium ion containing compound is present in an amount of from 0.0035 wt % to 1 wt % relative to the total dry calcium carbonate.

41. The process according to claim 1, wherein the at least one lithium ion containing compound is present in an amount of from 0.02 wt % to 0.4 wt % relative to the total dry calcium carbonate.

42. The process according to claim 1, wherein the at least one calcium carbonate material comprises GCC and PCC, wherein the PCC is present in amount of from 10 to 90 wt %, based on the total weight of PCC and GCC.

43. The process according to claim 1, wherein the at least one calcium carbonate material comprises GCC and PCC, wherein the PCC is present in amount of from 20 to 80 wt %, based on the total weight of PCC and GCC.

44. The process according to claim 1, wherein the at least one calcium carbonate material comprises GCC and PCC, wherein the PCC is present in amount of from 30 to 70 wt %, based on the total weight of PCC and GCC.

45. The process according to claim 1, wherein in step (a), the at least one calcium carbonate material is provided as an aqueous suspension comprising from 1 wt % to 82 wt % of dry GCC and/or PCC.

46. The process according to claim 1, wherein in step (a), the at least one calcium carbonate material is provided as an aqueous suspension comprising from 15 wt % to 81 wt % of dry GCC and/or PCC.

47. The process according to claim 1, wherein in step (a), the at least one calcium carbonate material is provided as an aqueous suspension comprising from 40 wt % to 80 wt % of dry GCC and/or PCC.

48. The process according to claim 1, wherein in step (a), the at least one calcium carbonate material is provided as an aqueous suspension comprising from 63 wt % to 72 wt % of dry GCC.

49. The process according to claim 1, wherein in step (a), the at least one calcium carbonate material is provided as an aqueous suspension comprising from 47 wt % to 72 wt % of dry PCC.

50. The process according to claim 1, wherein the Brookfield™ viscosity of the calcium carbonate material after 1 hour of production is below 500 mPa·s measured for one minute of stirring at 21° C. at a rotation speed of 100 rpm, and wherein the Brookfield™ viscosity after 8 days of unstirred storage is below 1000 mPa·s measured for one minute of stirring at 21° C. at a rotation speed of 100 rpm.

51. The process according to claim 1, wherein the Brookfield™ viscosity of the calcium carbonate material after 1 hour of production is below 500 mPa·s measured for one minute of stirring at 21° C. at a rotation speed of 100 rpm, and wherein the Brookfield™ viscosity after 8 days of unstirred storage is below 500 mPa·s measured for one minute of stirring at 21° C. at a rotation speed of 100 rpm.

52. The process according to 1, wherein the calcium carbonate material having a surface with improved adsorption properties of dispersant has a scattering coefficient S of ≥120 m2/kg for a coating weight of 20 g/m2 and a Brookfield™ viscosity of <1000 mPa·s.

53. The process according to 1, wherein the calcium carbonate material having a surface with improved adsorption properties of dispersant has a scattering coefficient S of ≥140 m2/kg for a coating weight of 20 g/m2 and a Brookfield™ viscosity of <500 mPa·s.

54. The process according to claim 1, wherein the at least one lithium ion containing compound is lithium carbonate, lithium sulfate, lithium citrate, or lithium hydroxide.

55. The process according to claim 1, wherein the at least one lithium ion containing compound is lithium carbonate.

56. The process according to claim 1, wherein the dispersant introduced in step (a) and/or step (c) comprises a polyacrylic acid totally neutralized with potassium, calcium, sodium or a mixture of sodium and magnesium.

57. The process according to claim 1, wherein the inorganic monomeric lithium salt or the organic monomeric lithium salt is a lithium monovalent acid salt or a lithium polyvalent acid salt.

\* \* \* \* \*